United States Patent [19]

Han

[11] Patent Number: 5,231,541
[45] Date of Patent: Jul. 27, 1993

[54] DRIVER FOR OPTICAL SYSTEM

[75] Inventor: Chang-su Han, Kyunggi-do, Rep. of Korea

[73] Assignee: SamSung Electronics Co., Ltd., Suwon, Rep. of Korea

[21] Appl. No.: 828,284

[22] Filed: Jan. 30, 1992

[30] Foreign Application Priority Data

May 16, 1991 [KR] Rep. of Korea ............... 91-8015

[51] Int. Cl.$^5$ ............................ G02B 7/02; G11B 7/00
[52] U.S. Cl. ................................ 359/814; 359/824; 369/44.16
[58] Field of Search .................. 359/808–827, 359/871, 879–882, 896, 900, 554–557, 811–824; 369/44.11–44.19, 44.21–44.23, 44.14–44.19, 44.21–44.24

[56] References Cited

U.S. PATENT DOCUMENTS

| | | | |
|---|---|---|---|
| 4,595,257 | 6/1986 | Fladlien | 359/824 |
| 4,906,831 | 3/1990 | Yomoda et al. | 369/44.14 |
| 5,018,836 | 5/1991 | Noda et al. | 359/824 |

FOREIGN PATENT DOCUMENTS

| | | | |
|---|---|---|---|
| 16041 | 1/1986 | Japan | 359/823 |
| 38405 | 2/1987 | Japan | 359/823 |
| 1262438 | 10/1986 | U.S.S.R. | 359/824 |
| 2019596 | 10/1979 | United Kingdom | 359/554 |

*Primary Examiner*—Bruce Y. Arnold
*Assistant Examiner*—Thong Nguyen
*Attorney, Agent, or Firm*—Robert E. Bushnell

[57] ABSTRACT

A driver for driving a lens holder mounted on at least a part of an optical system, comprises a pair of inner rods, and a pair of outer rods. The driver can be employed in an optical pickup and similar devices, and particularly in an optical pickup of a portable disk player or a disk player of a car which is usually subjected to severe external impact and demands for a lower power consumption.

15 Claims, 2 Drawing Sheets

DRIVER FOR OPTICAL SYSTEM

BACKGROUND OF THE INVENTION

The present invention relates to a driver for an optical system for horizontally and vertically driving an optical lens or a whole or a part of an optical pickup system including the lens, and more particularly to a driver for an optical pickup system capable of enduring severe external vibration and consuming less power.

A driver for an optical pickup system for recording and/or reproducing optical information in, for example, an optical or magneto-optical disk drive. The optical pickup system records information by focusing the modulated optical beams for scanning a rotating disk. The optical pickup system reproduces the information by scanning the disk with unmodulated light, and detecting modulated optical beams reflected from the disk. In both the record and the playback processes, the disk's mirror face (a recording face) must be in a focal plane, and an optical focus concentrating on the mirror face must precisely trace the center of a track. However, since the recording face is a rough plane and often vibrates in a planar direction due to external vibration and its tilted position, the recording face does not always match the focal plane. Further, when the disk is mounted off-center, the recording face rotates in an elliptical shape and not in a circular shape, which may force the optical focus out of the track's center. As a result, offset focusing and tracking of the optical focus from the track of the disk frequently occur. Therefore, to correct the focusing and tracking offsets, a driver for minutely driving at least a part of the optical pickup system in vertical and horizontal directions is required.

There are disclosed prior art drivers in Japanese laid-open patent publication 1-258236 and Japanese laid-open utility model sho 61-37127. The driver of the former comprises a lens holder having an objective lens of an optical pickup and vertical and horizontal driving coils, a permanent magnet for forming a magnetic field around the driving coils, and a plurality of resilient wires for positioning the neutral position of the lens holder. According to the driver, electromagnetic force created when current flows through the vertical and horizontal driving coils moves the lens holder slightly in a vertical and a horizontal direction, thereby overcoming the elasticity of the resilient wires for holding the lens holder. Here, in order to precisely move the lens holder to a desirable place, the resilient wires must have the same elastic modulus and their own oscillation characteristics must not change under impact. However, since the elastic moduli of the resilient wires tend to have minute differences from one another, the lens holder is distorted and becomes offset when frequent external vibration occurs.

Meanwhile, the driver of the latter having an objective lens mounted at an offset position of the lens holder, for rotating the lens holder on an axis and moving the same in the axis direction. When driving the driving system vertically and horizontally, the moment of inertia due to the mass of the lens holder is unbalanced depending on the position of the objective lens so that the position of the lens holder also changes under minute impacts. Particularly, a counter voltage must always be applied to the vertical driving coil so as to fix the neutral position of the lens holder in the vertical and horizontal directions. This application of the counter voltage consumes a great deal of power.

SUMMARY OF THE INVENTION

Therefore, it is an object of the present invention to provide a driver for an optical system whereby a lens holder cannot be displaced or inclined due to impacts, that is, a driver which is stable and hardly affected by vibration.

The above object is accomplished by employing, in a driver for an optical system, a plurality of connecting element which properly changes their directions according to the movement of the lens holder, and a plurality of supports which are not deformable.

Accordingly, the driver of the present invention comprises a pair of inner rods each having three connecting elements pivoting in any direction, and arranged in symmetric and parallel with each other in a same plane so as to swing while centering on a central connecting element, and a pair of outer rods each having at least one connecting element pivoting in any direction and disposed in parallel in a plane different from the plane of the pair of inner rods so that, looking downward, the pair of inner rods are arranged inside the pair of outer rods, and connected to the pair of inner rods to swing while centering on the central connecting element, wherein a lens holder is connected to one connecting element among the three connecting elements of the pair of inner rods, enabling the pairs of inner and outer rods to swing in the direction of the respective planes and in the direction of a plane vertical to the respective planes according to the vertical and horizontal movement of the lens holder.

Here, for example, an objective lens of an optical pickup is mounted on the lens holder or a whole or a part of the optical pickup system.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
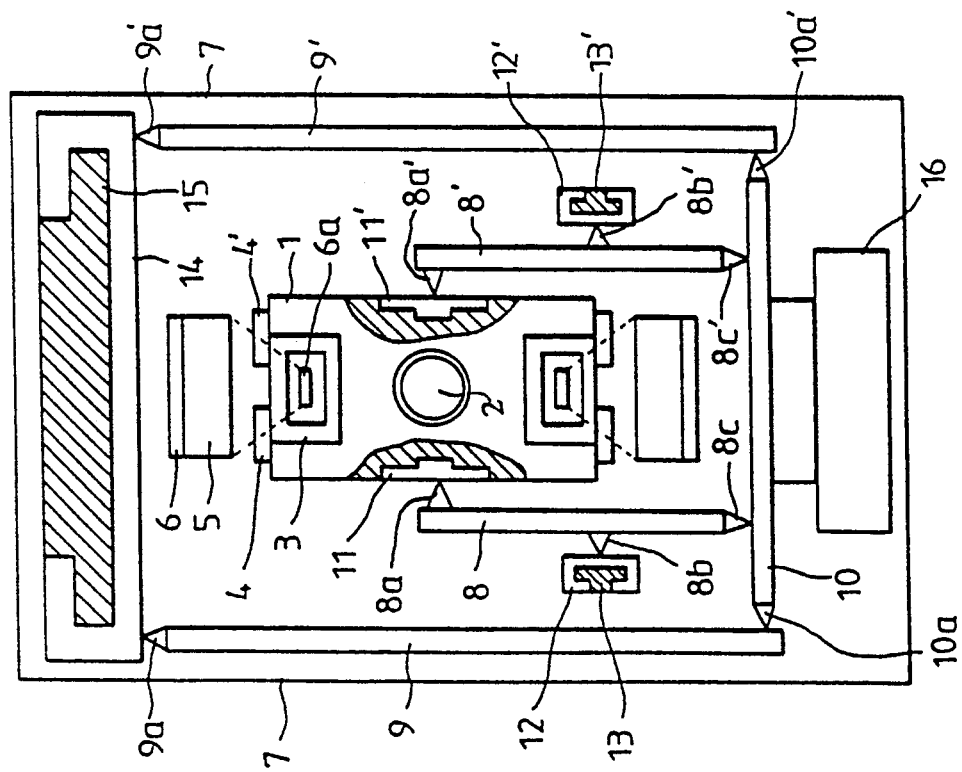
FIG. 1 is a plain view of an embodiment of the driver for an optical system of the present invention.

Referring to FIG. 1, a lens 2 is mounted on a lens holder 1. The lens 2 used is, for example, an objective lens of an optical pickup. A vertical driving coil 3 and a horizontal driving coil 4 and 4' are provided on a front and a rear face of the lens holder 1 equally. A permanent magnet 5 and a yoke member 6 for forming a magnetic field in the coils are fixedly installed on a base 7. The lens holder 1 is suspended from the base by inner rods 8 and 8' and outer rods 9 and 9' and capable of being movable.

The inner and outer rods 8, 8', 9, and 9' are connected by a connecting rod 10 and arranged in parallel with one another item.

A pair of inner rods 8 and 8' each has three respective cones 8a, 8b, 8c, 8a', 8b', and 8c' as the connecting elements. Each of the cones may be of a square cone shape. The cones 8a and 8a' each having a tip at one side end of the inner rods 8 and 8' is connected to the side centers of the lens holder 1 via a pair of connecting members 11 and 11'. The central cones 8b and 8b' are fixedly connected to a pair of inner fixing posts 13 and 13' installed on the base 7 via a pair of inner supports 12 and 12' connected to the tips of the central cones. The remaining cones 8c and 8c' are connected directly to the connecting rod 10. The lengths from each of the central cones 8b and 8b' to the remaining outer cones 8a and 8a', 8c and 8c' are substantially identical; and each of the remaining outer cones 8a and 8a', 8c and 8c' has a substance of a same mass inertia moment.

A pair of outer rods 9 and 9' have respective cones 9a and 9a' at one end thereof. Cones 9a and 9a' having tips are fixedly connected to an outer fixing post 15 installed on the base 7 via an outer support 14. The other ends of the outer rods 9 and 9' are connected to the tips of cones 10a and 10a' of the connecting rod 10.

A balance plumb 16 is connected to of connecting rod 10 in an opposite direction from the lens holder so as to balance the lens holder 1.

Together with the connecting elements and supports, the inner and outer rods 8, 8', 9 and 9', and connecting rod 10 can be formed as one body of synthetic resin by an injection molding. The position of the lens holder 1 and the balance plumb 16 can also be reversed.

Figure 2:
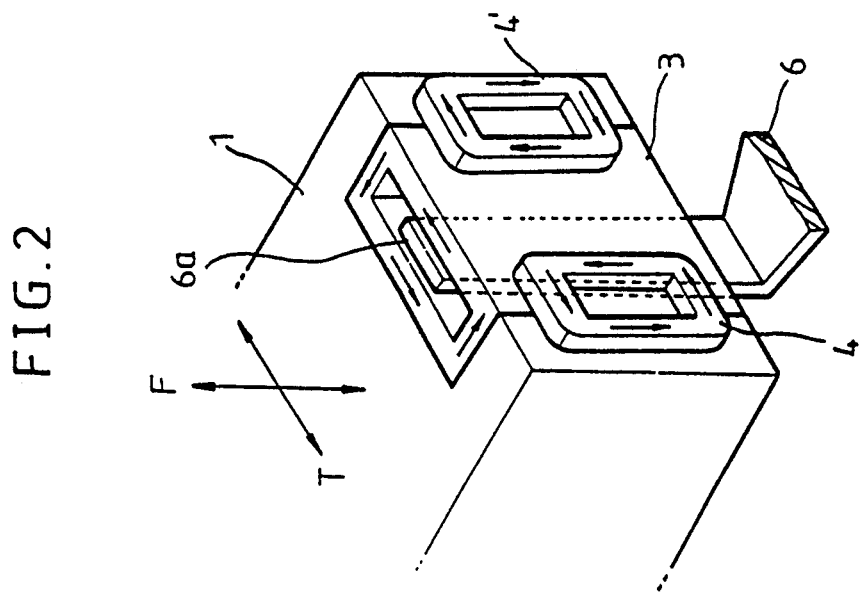
FIG. 2 is a partially extracted perspective view of the driver for an optical system describing a displacement of a lens holder according to the present invention.

Considering the above construction, force applied to the lens holder 1 will be described below. Only a portion within the dotted line of FIG. 1 from the vertical and horizontal driving coils 3, 4 and 4' interlinks the magnetic flux directed from the permanent magnet 5 to an end 6a of the yoke member 6. Thus, as shown in FIG. 2, when current flows through the vertical and horizontal driving coils 3, 4, and 4', upward force and leftward force are applied to the lens holder 1. As a result, the lens holder 1 moves in a focusing direction F and in a tracking direction T according to the direction of the current. The movements of inner and outer rods 8, 8', 9, and 9' is in accord with the movement of the lens holder 1 as shown in FIGS. 3A and 3B.

Figure 3A:
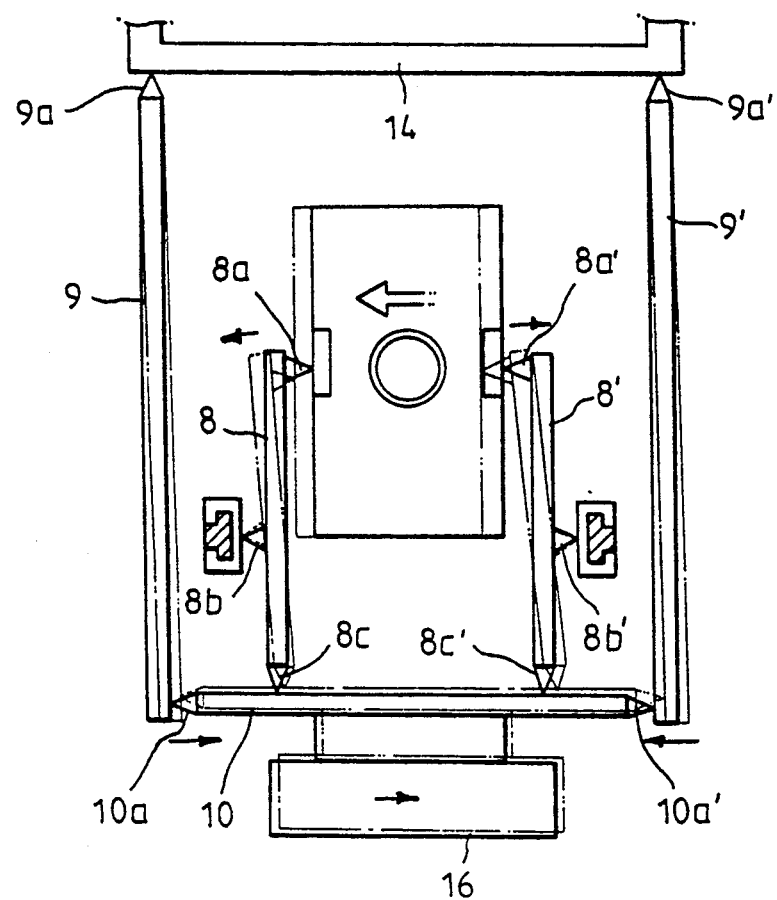
FIG. 3A is a schematic plain view of the driver for an optical system describing a driving system during tracking.

First, when the current flows through the horizontal driving coils 4 and 4' to move the lens holder 1 to a left in the tracking direction T, as shown in FIG. 3A, the inner rods 8 and 8' swing while centering on the central cones 8b and 8b' on a same plane. Simultaneously, the outer rods 9 and 9' and the connecting rod 10 connected to the inner rods 8 and 8' relatively swing to displace the cones 8c, 8c', 9a, 9a', 10a, and 10a'. Since the inner and outer rods 8, 8', 9 and 9' swing in the direction of a plane vertical with respect to their planes, lens holder 1 does not swing in a planar direction but is translated horizontally. Accordingly, a tracked focus position of the lens 2 mounted on the lens holder 1 does not change.

Figure 3B:
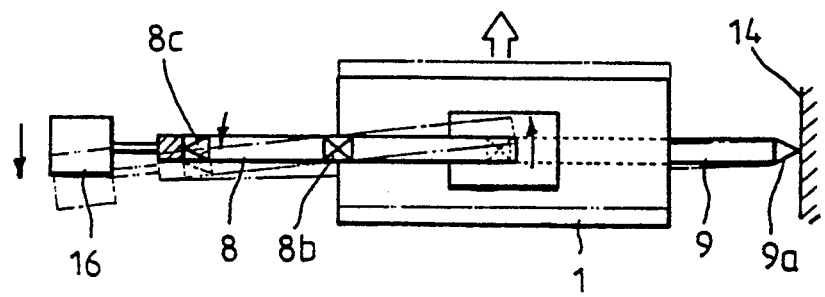
FIG. 3B is a schematic side view of the driver for optical system describing a driving system of the present invention during focusing.

Meanwhile, when the current flows through the vertical driving coil 3 to move the lens holder upward in a focusing direction F, as shown in FIG. 3B, the inner rods 8 and 8' swing in a planar direction centering about an end of the central cones 8b and 8b'. Simultaneously, the outer rods 9 and 9' and the connecting rod 10 swing in the same relative direction. In other words, the inner and outer rods 8, 8', 9, and 9' swing in the direction of their respective planes so that their planes lean toward one another. Here, connected to the cones 8a and 8a' at one end of the inner rods 8 and 8', the lens holder 1 rises straight up while maintaining its balance. Since the balance plump 16 is opposite to the lens holder 1 while centering about the central cones 8b and 8b', the lens holder 1 never falls due to its own weight which is naturally fixed on a vertical movement position. Therefore, it is unnecessary to apply a counter voltage to the vertical driving coil 3 in order to prevent the falling due to the lens holder's weight.

Since the distance of the vertical and horizontal movement of the lens holder 1 differs according to the distance between the cones 8a and 8b, and between the cones 8a' and 8b' of the inner rods 8 and 8', the movement position of the lens holder 1 that is, the focal depth and track position of the lens 2, can be precisely controlled by controlling the distance between the cones.

As described above in detail, the driver of the present invention can be employed in an optical pickup and similar devices, and particularly in an optical pickup for a portable disk player or a disk player for a car which is usually subjected to severe external impact and demands for a low power consumption.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A driver for driving a lens holder mountable on a part of an optical system, comprising:

a pair of inner rods each having two outer connecting elements mountable in proximity of respective end points and a central connecting element mountable in proximity of a center point, said pair of inner rods being symmetrically arranged in parallel with each other in a first plane, said inner rods being swingable about said center point; and a pair of outer rods each having at least one connecting element, said pair of outer rods being disposed in parallel in a second plane, arranged outside of said pair of inner rods, and connected to said pair of inner rods, each of said outer rods of said pair of outer rods being swingable about said at least one connecting element, respectively, said lens holder being connected to one of said outer connecting elements of said pair of inner rods, and said pairs of inner and outer rods being swingable in accordance with movements of said lens holder.

2. The driver for an optical system as claimed in claim 1, further comprised of a connecting rod having a connecting element at each end, for connecting said pair of inner rods and said pair of outer rods.

3. The driver for an optical system as claimed in claim 1, wherein the lengths from each of said two outer connecting elements to said central connecting element, of said inner rods, are substantially identical.

4. The driver for an optical system as claimed in claim 2, wherein said pairs of inner and outer rods, each of said connecting elements and said connecting rod are formed as one body of resin fabricated by injection molding.

5. the driver for an optical system as claimed in claim 2, wherein said pairs of inner and outer rods and said connecting rod are formed as one body of resin fabricated by injection molding.

6. The driver for an optical system as claimed in claim 1, wherein each of said two outer connecting elements of said pair of inner rods has a substance of a same mass inertia moment with respect to said center point.

7. The driver for an optical system as claimed in claim 3, wherein each of said two outer connecting elements of said pair of inner rods has a substance of a same mass inertia moment with respect to said center point.

8. An objective lens driving apparatus, comprising:
an objective lens holder having a plurality of drive coils for controlling movement of an objective lens;
a base having a pair of inner posts, an outer post, and permanent magnets for forming a magnetic field in said drive coils;
a pair of inner rods pivotally mounted on said pair of inner posts at respective center points of said inner rods, said inner rods being disposed in parallel with each other, and having respective first distal ends for supporting said objective lens holder to flexibly displace said objective lens holder to a position in accordance with a focusing direction and a tracking direction;
a pair of outer rods pivotally connected to said outer post at respective ones of first distal ends of said outer rods, said outer rods being disposed in parallel with each other and positioned outside of said pair of inner rods; and
a connecting rod arranged to connect said pair of inner rods to said pair of outer rods at each of corresponding second distal ends of said pair of inner rods and outer rods.

9. The objective lens driving apparatus as claimed in claim 8, wherein said pairs of inner and outer rods and said connecting rod are formed as one body of synthetic resin fabricated by injection molding.

10. The objective lens driving apparatus as claimed in claim 8, further comprising a balance plumb attached to said connecting rod, for providing counterweight to said objective lens holder while said pair of inner rods pivots about said pair of inner posts when said objective lens holder moves in said focusing direction.

11. An objective lens driving apparatus, comprising:
an objective lens holder having a plurality of drive coils, for supporting an objective lens;
a base having a pair of inner posts, an outer post, and permanent magnets for forming a magnetic field in said drive coils;
a pair of inner rods disposed in parallel with each other, each of said inner rods having a central connecting element pivotally mounted on a respective one of said pair of inner posts, and a first distal connecting element at a first end for supporting said objective lens holder to flexibly displace said objective lens holder to a position in accordance with a focusing direction and a tracking direction;
a pair of outer rods disposed in parallel and outside of said pair of inner rods, each of said outer rods having a first distal connecting element at a first end pivotally mounted on said outer post; and
a connecting rod disposed to connect said pair of inner rods to said pair of outer rods at each of corresponding second distal connecting elements of each of said pair of inner and outer rods.

12. The objective lens driving apparatus as claimed in claim 11, wherein said pairs of inner rods and outer rods, said connecting elements and said connecting rod are formed as one body of synthetic resin fabricated by injection molding.

13. The objective lens driving apparatus as claimed in claim 11, further comprising a balance plumb attached to said connecting rod, for providing counterweight to said objective lens holder while said pair of inner rods pivots about said pair of inner posts when said objective lens holder moves in said focusing direction.

14. The objective lens driving apparatus as claimed in claim 11, wherein each of said connecting elements comprises a pivoting element of a square cone shape.

15. The objective lens driving apparatus as claimed in claim 14, wherein said pairs of inner rods and outer rods, said connecting elements and said connecting rod are formed as one body of synthetic resin fabricated by injection molding.

* * * * *

UNITED STATES PATENT AND TRADEMARK OFFICE
CERTIFICATE OF CORRECTION

PATENT NO. :   5,231,541
DATED      :   July 27, 1993
INVENTOR(S) :  Chang-su Han It is certified that error appears in the above-indentified patent and that said Letters Patent is hereby corrected as shown below:

Column 3,    Line 26,    Preceding "connecting", Change "of" to --the-- ;

Column 4,    Line 65,    Preceding "driver", Change "the" to --The-- .

Signed and Sealed this

Eighteenth Day of October, 1994

Attest:

BRUCE LEHMAN

*Attesting Officer*    *Commissioner of Patents and Trademarks*